United States Patent
Bellé et al.

(10) Patent No.: US 8,874,039 B2
(45) Date of Patent: Oct. 28, 2014

(54) METHOD OF OPERATING A MOBILE TELECOMMUNICATION TERMINAL

(75) Inventors: Phillip Bellé, München (DE); Dennis Pagano, Garching (DE); Damir Ismailović, München (DE)

(73) Assignee: Moid GmbH, München (DE)

( * ) Notice: Subject to any disclaimer, the term of this patent is extended or adjusted under 35 U.S.C. 154(b) by 111 days.

(21) Appl. No.: 13/554,432

(22) Filed: Jul. 20, 2012

(65) Prior Publication Data

US 2013/0023213 A1    Jan. 24, 2013

(30) Foreign Application Priority Data

Jul. 22, 2011  (DE) .................. 10 2011 108 388

(51) Int. Cl.
| | |
|---|---|
| *H04B 7/00* | (2006.01) |
| *H04L 12/58* | (2006.01) |
| *H04W 4/00* | (2009.01) |
| *H04W 4/02* | (2009.01) |

(52) U.S. Cl.
CPC ............. *H04L 51/20* (2013.01); *H04W 4/008* (2013.01); *H04W 4/02* (2013.01); *H04W 4/00* (2013.01); *H04L 51/38* (2013.01)
USPC ..................... 455/41.2; 455/412.1

(58) Field of Classification Search
CPC ......... H04L 51/20; H04L 12/16; H04W 4/00; H04W 4/02; H04W 8/20; H04W 8/205; H04B 5/00; H04B 5/0025
USPC .............. 455/412.1, 41.1, 41.2, 41.3
See application file for complete search history.

(56) References Cited

U.S. PATENT DOCUMENTS

| | | | |
|---|---|---|---|
| 8,095,118 B2 * | 1/2012 | Boctor ...................... 455/414.3 |
| 8,498,621 B2 * | 7/2013 | Jones et al. ................ 455/412.1 |
| 2005/0176370 A1 * | 8/2005 | McSheffrey et al. ........ 455/41.2 |
| 2007/0129959 A1 * | 6/2007 | Bransky et al. .................... 705/1 |
| 2008/0188202 A1 * | 8/2008 | Maeng ........................ 455/412.1 |
| 2009/0181653 A1 * | 7/2009 | Alharayeri ................. 455/414.1 |
| 2010/0069058 A1 * | 3/2010 | Rothschild ................. 455/422.1 |

OTHER PUBLICATIONS

Rao Leena: "CardFlick debuts location-based mobile professional contact sharing App", in: Online article on TechCrunch, Jul. 7, 2011.

* cited by examiner

*Primary Examiner* — Ping Hsieh
(74) *Attorney, Agent, or Firm* — Henry M Feiereisen LLC

(57) ABSTRACT

As a realistic alternative to traditional business cards for fast and flawless electronic exchange of contact data, a search for additional mobile telecommunication terminals within a predetermined range of a mobile telecommunication terminal is conducted using a wireless connection. When a second mobile telecommunication terminal is within the predetermined range, an identification element associated with the user of the additional mobile telecommunication terminal is loaded into memory of the first mobile telecommunication terminal and displayed together with a confirmation control element on a user interface of the first telecommunication terminal. Upon actuation the confirmation control element, presence of a consent element generated by the user of the second telecommunication terminal and associated with the user of the first telecommunication terminal is checked. When the consent element is present, contact data of the user of the second mobile telecommunication terminal are loaded into the memory of the first mobile telecommunication terminal.

14 Claims, 2 Drawing Sheets

METHOD OF OPERATING A MOBILE TELECOMMUNICATION TERMINAL

CROSS-REFERENCES TO RELATED APPLICATIONS

This application claims the priority of German Patent Application, 10 2011 108 388.3, filed Jul. 22, 2011, pursuant to 35 U.S.C. 119(a)-(d), the content of which is incorporated herein by reference in its entirety as if fully set forth herein.

BACKGROUND OF THE INVENTION

The present invention relates to a method for operating a mobile telecommunication terminal.

The following discussion of related art is provided to assist the reader in understanding the advantages of the invention, and is not to be construed as an admission that this related art is prior art to this invention.

In these days, professional success in business can depend heavily on personal contacts. Business professionals therefore have, on the one hand, great interest to offer their personal data in a professional manner and to keep them up to date and, on the other hand, to manage the amount of received contact data in a meaningful way.

This occurs even in the era of electronic data processing frequently still in form of established business cards. Business cards are exchanged during face-to-face meetings and contact data handed over in this manner. While in many places the business cards are still kept in the corresponding file boxes, the data are often captured electronically and stored in an electronic address book. The advantages of the latter method are obvious: they provide substantial space saving, can be more easily searched, and are available independent of the location.

However, errors can still occur when entering the business card data into the electronic address book. Furthermore, the input is fairly complicated in view of the large quantity of business cards received, for example, after visiting a trade show. Business cards can also be easily lost, and the identification of individuals and association of the individual data are often difficult. Therefore, attempts have been made to distribute business cards or contact information personally. One possibility is the vCard format proposed by Apple, AT&T, IBM and Siemens. However, vCards must still be sent manually and requires awareness of at least one email address, so that in practice the exchange of business cards still precedes the exchange of vCard.

Attempts have also been made to scan or photograph business cards and thus automate the collection of data. However, these attempts are still comparatively flawed because of the variety of card formats. More recently, programs such as "Bump" offer new possibilities. With the method of this program, mobile telecommunications devices, i.e. mobile devices that can establish any type of wireless connection, such as smart phones, iPads etc., must be brought into physical contact with each other to exchange contact data. However, is difficult to imagine that business professionals in a reputable environment will bring their cell phones into contact to exchange contact information, so that this method has not taken hold in the business sector. This method for exchanging business card data is also impractical when a large number of persons are involved.

Alternatives include portals for the exchange of contact information, such as Facebook or Twitter; however, these portals do not allow exchange of contact data on site, for example directly at a trade show, because the portals are detached from the user's location. These portals are therefore, much like the aforementioned programs, no realistic alternative to traditional business cards that are therefore still in widespread use.

It would therefore be desirable and advantageous to obviate prior art shortcomings and to provide an improved method for operating a mobile telecommunication terminal, which provides as a realistic alternative to traditional business cards a fast and flawless exchange of contact data by way of technical, electronic means.

SUMMARY OF THE INVENTION

According to one aspect of the present invention, a method of operating a first mobile telecommunication terminal includes the steps of searching for second mobile telecommunication terminals within a predetermined range of the first mobile telecommunication terminal by way of a wireless connection; when a second mobile telecommunication terminal is detected within the predetermined range, loading an identification element associated with a user of the second mobile telecommunication terminal into an internal memory of the first mobile telecommunication terminal; displaying the identification element together with a confirmation control element on a user interface of the first telecommunication terminal; actuating the confirmation control element and checking the first telecommunication terminal for presence of a consent element generated by the user of the second telecommunication terminal and associated with the user of the first telecommunication terminal; and when the consent element is present, loading contact data of the user of the second mobile telecommunication terminal into the internal memory of the first mobile telecommunication terminal.

The invention is based on the concept that electronic devices should be used for a practical, direct electronic exchange of contact data on site, which are always carried by the users in order to ensure constant availability of the exchange system. Particularly suitable are mobile telecommunications devices, such as smart phones, or lightweight tablets which, the one hand, can always be carried and which, on the other hand, include major software and hardware requirements that allow an implementation of an electronic business card system. When a meeting of two people takes place, their respective mobile telecommunication terminals are necessarily also located from each other within a predetermined range, for example 3 meters. Other terminals within the range of the first terminal should therefore be sought by means of a wireless connection so as to identify the persons reached by the user of the device. All types of wireless connections may be used, such as WLAN, Bluetooth, NFC and GPS.

When a mobile terminal is found, the user should be given the option to exchange contact data. However, an automatic exchange is not desirable, as this would result, on one hand, a flood of sometimes unwanted contact data protection and, on the other hand, also create problems with data protection. Therefore, only an identification element associated with the user of the found terminal is initially loaded into a memory of the first mobile telecommunication terminal. The identification element does not include the complete contact information, but only information enabling identification of the user.

Advantageously, this identification element may be displayed to the user along with a confirmation control element, possibly with a time delay, i.e. not only immediately during the meeting but, for example, also several hours thereafter, when the mobile terminals are no longer in communication range. The user may then confirm the contact by operating the confirmation control element. Again, the contact data should actually be transferred only upon mutual consent for reasons of data protection. It should therefore be determined whether the user of the found terminal also desires the exchange of contact data. This can be achieved by means of a consent element that is stored when the user of the found terminal consents with respect to the user of the first terminal and contains substantially the relevant information regarding the consent in digital form. Thus, it is checked whether a consent element exists and if a consent element exists, the contact data are transferred to the internal memory of the mobile terminal.

According to an advantageous feature of the present invention, when the operating control element is actuated, a consent element associated with the user of the second mobile telecommunication terminal is generated. This means that the user of the terminal gives his consent, when confirming the contact, to transfer his contact data to the user of the found terminal, with corresponding information being stored in digital form. This produces a symmetry which simplifies the use of the method in interconnected networks of multiple devices operated with the method. The consent is confirmed by both sides, allowing exchange of contact data upon confirmation by both users. Advantageously, in this context a plurality of different confirmation elements may be provided which each generate a unique consent element differing in the extent of the consent. For example, a confirmation element may be provided for private data, one for business data and for data from social networks, so that in each case only one consent element is generated for the specific data. This allows a greater degree of freedom with respect to data protection.

According to an advantageous feature of the present invention, the respective contact data, the respective identification element and/or the respective consent elements may be stored in a server connected with the mobile telecommunication terminals. Storing the data and the elements on a central server accessible from the terminals has the particular advantage that the data and the elements are available at all times. This facilitates the exchange of data, querying the consent, etc., at times when the devices are no longer in direct communication since the data can be retrieved directly at any time. The contact data can thus be easily changed by granting users access to the server, for example, via an Internet portal, for updating contact data.

According to another advantageous feature of the present invention, the contacts on the first mobile telecommunication terminal may be changed commensurate with changes in the contact data on the server. This ensures that all contact information can be kept up to date on the terminals, because changes in the profile of a user stored on the server are immediately forwarded to those terminals that have downloaded the contact information, i.e. that have been confirmed by the user. This reduces considerably the cost of care for the address data for the individual user, because the local contact data are subsequently automatically changed when updated on the server.

According to another advantageous feature of the present invention, an input element may be displayed on the user interface of the first telecommunication terminal, wherein when data are entered into the input element, the data are checked for a match with the contact data stored in the server, associated users are determined upon a match of the matching contact data, and the identification element associated with the determined user together with a confirmation control element is displayed on the user interface of the first telecommunication terminal. In other words, displaying the identification element with the possibility of confirmation may not only be triggered by the proximity of mobile devices, but also by entering known parts of the contact data, such as the email address, in a particularly advantageous embodiment the telephone number. This also allows an exchange of contact data with users having a terminal that does not allow a wireless connection that could be used to localize other terminals. Such search for known parts of contact data may advantageously also be carried out automatically by using an address book of the mobile terminal as a data source for the parts of contact data. This can happen, for example, when the method is executed on the terminal for the first time. In this way, contacts that already exist on the device are automatically detected and analyzed with the method.

According to another advantageous feature of the present invention, the wireless connection may use a Bluetooth connection, because Bluetooth meets a large number of advantageous criteria: First, Bluetooth has a relatively short range, so that the Bluetooth range itself can be used as a criterion for the range, and the identification elements of all terminals reachable via Bluetooth are displayed. Furthermore, Bluetooth is standardized and thus supported by virtually all smartphones, tablets and portable computers, making the method broadly applicable.

According to an additional or alternative advantageous feature of the present invention, the wireless connection may include a GPS signal. With the GPS signal, the location of the respective mobile terminal can be reliably determined, and matching locations of two mobile terminals can also be determined. To ensure a reliable comparison, the GPS data may be analyzed on the central server. This server may receive and evaluate the GPS data sent from the mobile terminals to the server and arrange for the transmission of the identification elements terminal having a matching location.

According to an additional or alternative advantageous feature of the present invention, the wireless connection may include a wireless LAN signal. In this way, on one hand, devices located within the wireless LAN range can be captured. On the other hand, LAN network identifiers or SSIDs stored on a central server may also be used. When the SSID and the location of a wireless LAN network are known, terminals located at the same location and at the same time can be inferred from the location and the time of detection of the SSID signal of the network.

According to another advantageous feature of the present invention, the identification element may include a photo and/or a name of the user. In this way, in particular by a photographic reproduction, the data can be unambiguously associated with the contact data. This is a considerable advantage over conventional business cards, where association may cause problems, especially after receiving a large number of business cards. In addition, initials, so-called icons or fantasy names may be included.

According to another advantageous feature of the present invention, the contact data may include the phone number, the email address and/or the postal address of the user. In this way, the complete contact data, which are also available on classic business, are available after the exchange. With digital storage, additional data may also be included, such as links to home pages or profiles on social networks, etc. In another advantageous embodiment, the contact may also include resumes and other files associated with the respective contact. If the user is affiliated with a particular institution, then contact data of the institution may also be included, for example maps and programs for events, etc.

According to another advantageous feature of the present invention, the time and/or place of recognition of the second mobile telecommunication terminal within the specified range may be loaded into the internal memory of the first mobile telecommunication terminal. A history of meetings of the respective users may thus be created, which can be viewed at any time. For example, when recalling contact data, each user can view the number of times he has seen the particular contact during the last year, and when the last meeting took place or when the contact data were first exchanged. In addition, the time and/or place can advantageously be stored on the central server to ensure continuous availability.

According to another advantageous feature of the present invention, a note data element may be associated with the contact data loaded into the memory of the first mobile telecommunication terminal. For example, personal notes or reminders for tasks to be performed or the like may be stored. The note data element may also contain information about personal or business contacts. Upon detection of the mobile telecommunication terminal associated with the contact data within the predetermined range, the contents of the note data element is advantageously displayed on the user interface of the first telecommunication terminal. The user is then informed shortly before the arrival of the respective other user due to the greater range of the wireless network compared to the personal contact. The display can also be linked with a beep, vibration or visual signal. If the user has stored in the note data element a topic requiring urgent discussion, he will be reminded shortly before meeting of the respective other user.

According to another aspect of the invention, a computer program product that can be loaded directly into the internal memory of a mobile telecommunication terminal includes software code sections configured for executing the aforedescribed method when the computer program product is executed on the mobile telecommunication terminal.

Advantageously, such a computer program product may be loaded into the internal memory of a mobile telecommunication terminal, wherein a telecommunication system advantageously includes such a mobile telecommunication terminal.

Advantageously, with the invention the entire exchange and archiving process can be simplified by combining location functions of mobile terminals with the digital exchange of contact data, hence resulting in cost savings compared to a conventional exchange of a business card because a smaller number of business cards need to be printed. With the aforedescribed method, a very comfortable, technically simpler and more secure exchange of contacts is possible especially in the business sector.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
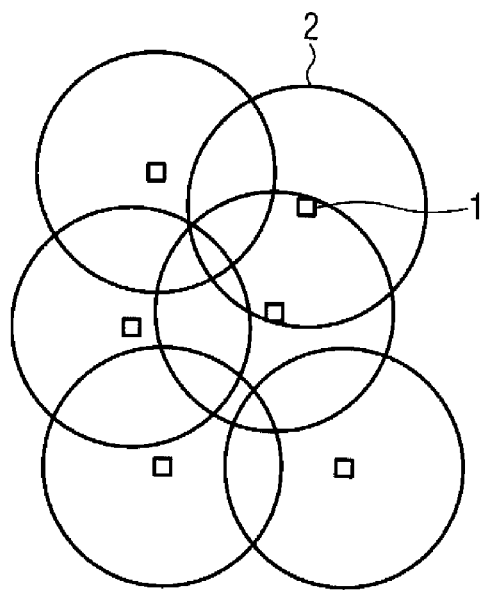
FIG. 1 shows an environment with a plurality of mobile telecommunication terminals according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown schematically an environment with a plurality of mobile communication terminals 1 having N1 . . . Nn different users, such as smart phones, tablet PCs, etc. Although the representation is static, the users and thus the telecommunication terminal equipment 1 are constantly in motion. The telecommunication terminals 1 are part of a telecommunication system, in the exemplary embodiment a GSM radio network. They may, for example, also be connected to the Internet via WLAN. A respective app is loaded into the internal memory of the telecommunication terminals 1, i.e. a computer program product having software sections, which causes the mobile telecommunication terminal 1 to execute the method described below.

A range 2 is defined for each mobile terminal. The range 2 is determined by a server connected with the telecommunication terminals 1 via the telecommunications system, with the server analyzing the GPS data of the telecommunication terminals 1. If the server detects that another telecommunication terminal 1 is within the range of 2, this other telecommunication terminal 1 recognized by the server and the telecommunication terminals 1 are notified accordingly. Alternatively, a Bluetooth signal could be used, which initially does not require contact with a server; however, continuous use of Bluetooth is frequently not always available on terminals, because the Bluetooth module frequently shuts down after a predetermined time. However, the peer-to-peer architecture of Bluetooth is advantageous.

Figure 2:
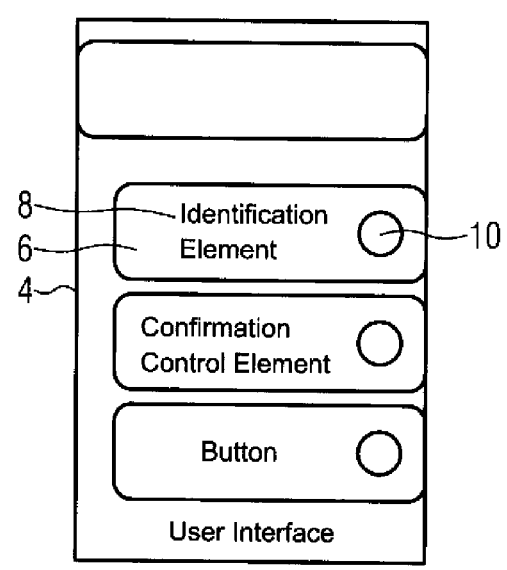
FIG. 2 shows the user interface of a mobile telecommunication terminal of a first user.

The following steps of the method will now be described using the users N1 and N5 as examples: It will be assumed that the mobile telecommunication terminals 1 of the users N2, N4 and N5 had come within range of the mobile telecommunication terminal 1 of the user N1. In this case, buttons 6 are displayed on the user interface 4 of the mobile telecommunication terminal 1 of the user N1 shown in FIG. 2—in the exemplary embodiment a smart phone display—, which each contain due to the range detection an identification element 8 loaded into the memory. The identification element 8 in the exemplary embodiment includes only the name, but it may also include a photo, facilitating the identification and association. Corresponding confirmation control elements 10 are located next to the identification element 8.

Figure 3:
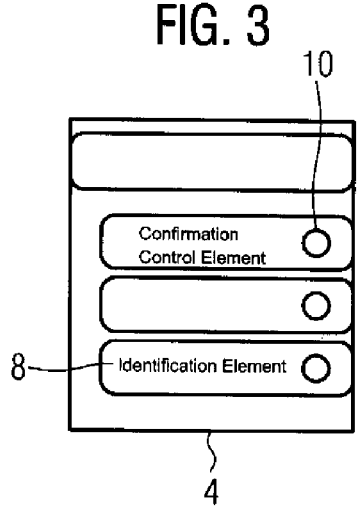
FIG. 3 shows the user interface of the mobile telecommunication terminal of the first user following a confirmation.

The user N1 now had actually personal contact with the users with N2 and N5. He therefore operates the confirmation control elements 10 associated with the respective users N2 and N5. This does not need to occur immediately, but can be done later. Consent elements associated with the respective users N1 N2 and N5 are generated upon actuation. After actuation, the respective confirmation control elements 10 are shown in different colors, as indicated in FIG. 3.

Figure 4:
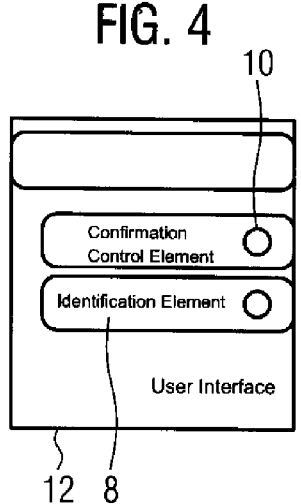
FIG. 4 shows the user interface of a mobile telecommunication terminal of a second user following a confirmation.
Figure 5:
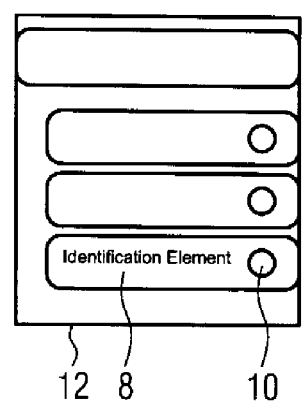
FIG. 5 shows the user interface of the mobile telecommunication terminal of the first user after mutual confirmation.

A similar display is produced on the user interface 12 of the user N5 in FIG. 4. This user had the users N1 and N2 within range, but had contact only with the user N1 and operated only the corresponding confirmation control element 10. The corresponding consent element was thereby generated. It is then discovered during the check that the consent element of user N5 associated with the user N1 is present. The user interface 4 of the user N1 shows this aspect in turn with a different color of the confirmation operating element 10, as shown in FIG. 5.

Figure 6:
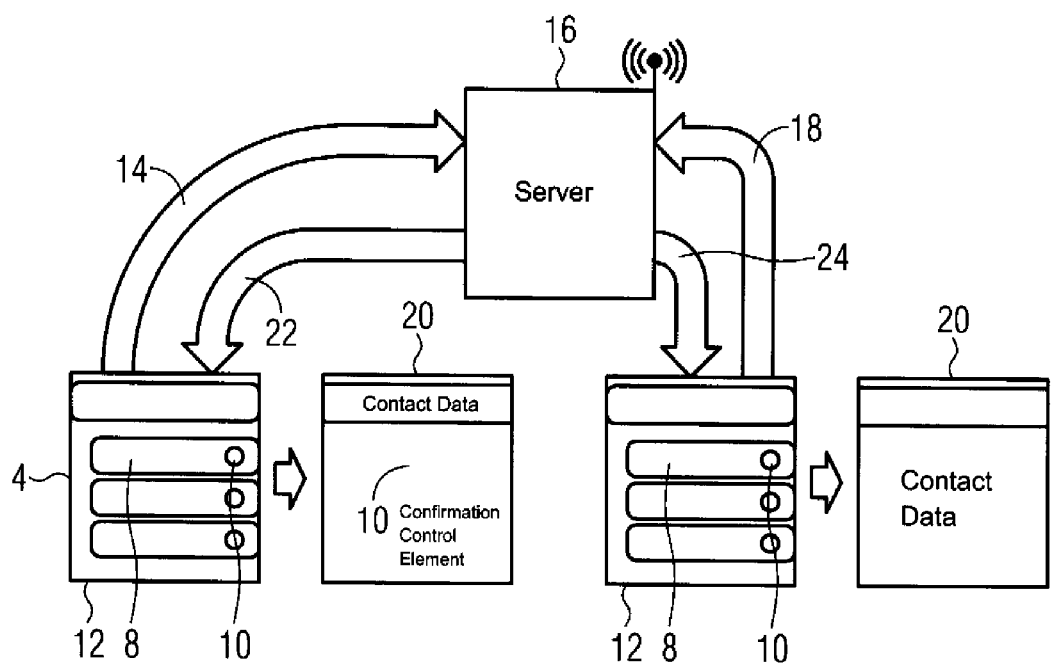
FIG. 6 shows schematically the process flow for exchanging contact data.

FIG. 6 shows in form of an overview the conclusion of the method. Shown are the user interfaces 4, 12, each representative of the user N1 and N5 or of their telecommunication terminals 1. At step 14, N1 the user gives consent by actuating the confirmation element 10. A corresponding consent element, for example an entry in a database stored on the server 16, is generated in the server 16. The same applies to the user N5 at step 18.

Since mutually agreed-to consent elements are now present, the contact data 20 of the respective user stored on the server are transferred, at step 22, to the user N1 and, at step 24, to the user N5 and stored in the memory, typically in the address book. The contact data 20 each include the telephone number, the telephone mobile number, the email address, as well as Skype name and Facebook name. The contact data 20 are stored on the server 16 and can be changed by the users N1 and N5 after logging in via a web interface. Changes are transferred automatically to the respective exchanged contacts.

Not shown is the possibility for triggering the display of the button 6 also by inputting parts of known contact data 20, in particular when the parts match contact data stored in the server 16. In addition, time and place of meetings with the respective contact are stored with the contact data in the mobile telecommunication terminal 1 as well as a note data element where personal notes and reminders can be stored. The display of the note can be triggered automatically by identifying the respective associated telecommunication terminal 1.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method of operating a first mobile telecommunication terminal, comprising the steps of:
    searching for second mobile telecommunication terminals within a predetermined range of the first mobile telecommunication terminal by way of a wireless connection;
    when a second mobile telecommunication terminal is detected within the predetermined range, loading an identification element associated with a user of the second mobile telecommunication terminal and stored in a server connectable with the first mobile telecommunication terminals from the server into an internal memory of the first mobile telecommunication terminal,
    displaying the identification element together with a confirmation control element on a user interface of the first telecommunication terminal;
    actuating the confirmation control element and checking the first telecommunication terminal for presence of a consent element generated by the user of the second telecommunication terminal, associated with the user of the first telecommunication terminal and stored in the server; and
    when the consent element is present in the server, loading contact data of the user of the second mobile telecommunication terminal from the server into the internal memory of the first mobile telecommunication terminal.

2. The method of claim and further comprising the step of generating a consent element associated with the user of the second mobile telecommunication terminal and stored in the server, when the confirmation operating element is actuated.

3. The method of claim 1, wherein the contact data on the first mobile telecommunication terminal are changed commensurate with a change of the contact data on the server.

4. The method of claim 1, wherein the wireless connection comprises a Bluetooth connection.

5. The method of claim 1, wherein the second mobile telecommunication terminal is detected within the predetermined range by a GPS signal.

6. The method of claim 1, wherein the wireless connection comprises a wireless LAN signal.

7. The method of claim 1, wherein the identification element comprises at least one of a photo and a name of the user.

8. The method of claim 1, wherein the contact data comprise at least one of a telephone number, an e-mail address and a postal address of the user.

9. The method of claim 1, wherein at least one of a time and a place of detecting the second mobile telecommunication terminal within the predetermined range is loaded into the internal memory of the first mobile telecommunication terminal.

10. The method of claim 1, further comprising the steps of:
    associating a note data element with the contact data loaded into the internal memory of the first mobile telecommunication terminal, and
    upon identification of the mobile telecommunication terminal associated with the contact data within the predetermined range, displaying content of the note data element on the user interface of the first telecommunication terminal.

11. A method of operating a first mobile telecommunication terminal, comprising the steps of:
    searching for second mobile telecommunication terminals within a predetermined range of the first mobile telecommunication terminal by way of a wireless connection;
    when a second mobile telecommunication terminal is detected within the predetermined range, loading an identification element associated with a user of the second mobile telecommunication terminal and stored in a server connectable with the first mobile telecommunication terminals from the server into an internal memory of the first mobile telecommunication terminal,
    displaying the identification element together with a confirmation control element on a user interface of the first telecommunication terminal;
    actuating the confirmation control element and checking the first telecommunication terminal for presence of a consent element generated by the user of the second telecommunication terminal, associated with the user of the first telecommunication terminal and stored in the server; and when the consent element is present in the server, loading contact data of the user of the second mobile telecommunication terminal from the server into the internal memory of the first mobile telecommunication terminal, displaying an input element on a user interface of the first telecommunication terminal;

performing a compliance check with the contact data stored in the server upon entry of data into the input element;

when the contact data stored in the server match the data entered into the input element, determining a user associated with the matching contact data; and displaying on the user interface of the first telecommunication terminal the identification element associated with the determined user together with a confirmation control element.

12. A computer program product, which is stored on a non-transitory computer-readable medium and can be loaded directly into an internal memory of a first mobile telecommunication terminal, comprises software code sections which when executed on the first mobile telecommunication terminal enable the first mobile telecommunication terminal to search for second mobile telecommunication terminals within a predetermined range of the first mobile telecommunication terminal by way of a wireless connection;

when a second mobile telecommunication terminal is detected within the predetermined range, load an identification element associated with a user of the second mobile telecommunication terminal and stored in a server connectable with the first mobile telecommunication terminals from the server into an internal memory of the first mobile telecommunication terminal, display the identification element together with a confirmation control element on a user interface of the first telecommunication terminal;

actuate the confirmation control element and check the first telecommunication terminal for presence of a consent element generated by the user of the second telecommunication terminal, associated with the user of the first telecommunication terminal and stored in the server; and when the consent element is present in the server, load contact data of the user of the second mobile telecommunication terminal from the server into the internal memory of the first mobile telecommunication terminal.

13. A first mobile telecommunication terminal comprising an internal memory having stored thereon software code sections which when executed on the mobile telecommunication terminal enable the mobile telecommunication terminal to search for second mobile telecommunication terminals within a predetermined range of the first mobile telecommunication terminal by way of a wireless connection;

when a second mobile telecommunication terminal is detected within the predetermined range, load an identification element associated with a user of the second mobile telecommunication terminal and stored in a server connectable with the first mobile telecommunication terminals from the server into an internal memory of the first mobile telecommunication terminal, display the identification element together with a confirmation control element on a user interface of the first telecommunication terminal;

actuate the confirmation control element and check the first telecommunication terminal for presence of a consent element generated by the user of the second telecommunication terminal, associated with the user of the first telecommunication terminal and stored in the server; and when the consent element is present in the server, load contact data of the user of the second mobile telecommunication terminal from the server into the internal memory of the first mobile telecommunication terminal.

14. A telecommunication system comprising a plurality of mobile telecommunication terminals configured to search for second mobile telecommunication terminals within a predetermined range of a first mobile telecommunication terminal by way of a wireless connection when a second mobile telecommunication terminal is detected within the predetermined range, load an identification element associated with a user of the second mobile telecommunication terminal and stored in a server connectable with the first mobile telecommunication terminals from the server into an internal memory of the first mobile telecommunication terminal, display the identification element together with a confirmation control element on a user interface of the first telecommunication terminal, actuate the confirmation control element and check the first telecommunication terminal for presence of a consent element generated by the user of the second telecommunication terminal, associated with the user of the first telecommunication terminal and stored in the server, and when the consent element is present in the server, load contact data of the user of the second mobile telecommunication terminal from the server into the internal memory of the first mobile telecommunication terminal.

* * * * *